(12) United States Patent
Guen

(10) Patent No.: US 9,196,893 B2
(45) Date of Patent: Nov. 24, 2015

(54) SECONDARY BATTERY

(71) Applicants: SAMSUNG SDI CO., LTD., Yongin-si, Gyeonggi-do (KR); ROBERT BOSCH GMBH, Stuttgart (DE)

(72) Inventor: Minhyung Guen, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 20 days.

(21) Appl. No.: 13/786,297

(22) Filed: Mar. 5, 2013

(65) Prior Publication Data

US 2013/0280563 A1   Oct. 24, 2013

(51) Int. Cl.
  *H01M 10/04* (2006.01)
  *H01M 2/34* (2006.01)
  *H01M 10/0525* (2010.01)
  *H01M 10/058* (2010.01)

(52) U.S. Cl.
  CPC .............. *H01M 2/34* (2013.01); *H01M 10/058* (2013.01); *H01M 10/0525* (2013.01); *H01M 2200/00* (2013.01); *H01M 2220/20* (2013.01); *Y02E 60/122* (2013.01); *Y02T 10/7011* (2013.01)

(58) Field of Classification Search
  CPC ........................................................ H01M 8/04
  See application file for complete search history.

(56) References Cited

U.S. PATENT DOCUMENTS

2009/0297940 A1\* 12/2009 Nansaka et al. .............. 429/162
2010/0279160 A1   11/2010 Lee et al.
2011/0183181 A1\*  7/2011 Moon et al. .................. 429/136

FOREIGN PATENT DOCUMENTS

KR   10-2006-0092445 A   8/2006
KR   10-2008-0005621 A   1/2008
KR   10-2011-0022509 A   3/2011

\* cited by examiner

*Primary Examiner* — Jacob Marks
(74) *Attorney, Agent, or Firm* — Christie, Parker & Hale, LLP

(57) ABSTRACT

A secondary battery including: a case including an accommodation space therein; an electrode assembly housed in the case, the electrode assembly including a coating portion, a first electrode including a first non-coating portion, and a second electrode including a second non-coating portion; a short circuit induction member electrically connected to at least one of the first or second non-coating portions; and a cap plate sealing the case, the short circuit induction member including a contact maintaining part extending along a longitudinal direction of the electrode assembly.

12 Claims, 5 Drawing Sheets

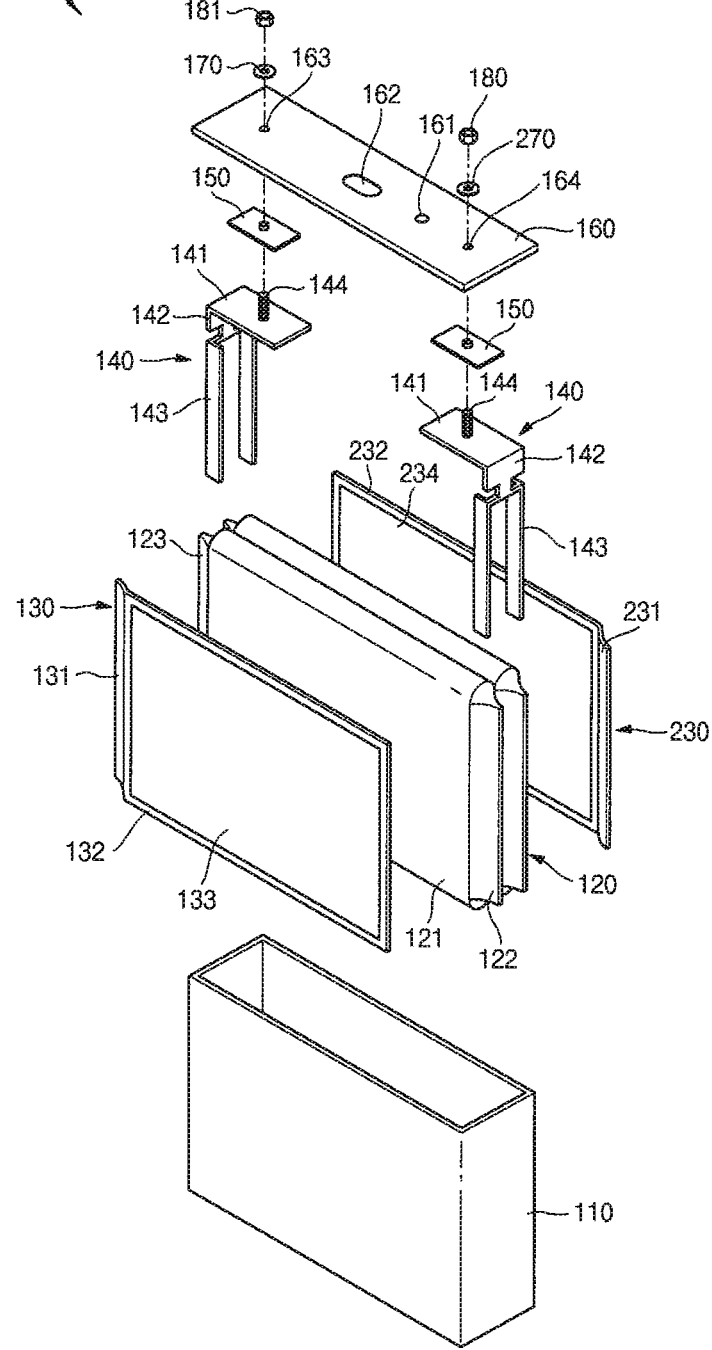

SECONDARY BATTERY

CROSS-REFERENCE TO RELATED APPLICATION

This application claims priority to and the benefit of Korean Patent Application No. 10-2012-0041659, filed on Apr. 20, 2012 in the Korean Intellectual Property Office, the entire content of which is incorporated herein by reference.

BACKGROUND

1. Field

Aspects of embodiments of the present invention relate to a secondary battery.

2. Description of the Related Art

Lithium ion secondary batteries are widely used in electronic devices such as notebook computers and cellular phones. Such lithium ion secondary batteries are superior to other types of secondary batteries in terms of power, capacity, and weight, and are also used in hybrid vehicles and electric vehicles.

Lithium ion secondary batteries for vehicles should satisfy the requirements of safety and reliability under harsh conditions. A penetrating test, a squeezing test, and an overcharging test are the harshest of safety tests.

Of these safety tests, the penetrating test and the squeezing test are very important in predicting damage to a secondary battery due to a vehicle accident. Particularly, the penetrating test and the squeezing test require that even after a nail penetrates a secondary battery, or a secondary battery is squeezed, the temperature of the secondary battery does not excessively increase.

SUMMARY

According to an aspect of embodiments of the present invention, a secondary battery has improved safety, even after being penetrated by an external force.

According to an embodiment of the present invention, a secondary battery includes: a case including an accommodation space therein; an electrode assembly housed in the case, the electrode assembly including a coating portion, a first electrode including a first non-coating portion, and a second electrode including a second non-coating portion; a short circuit induction member electrically connected to at least one of the first or second non-coating portions; and a cap plate sealing the case, the short circuit induction member including a contact maintaining part extending along a longitudinal direction of the electrode assembly.

The contact maintaining part may be at a region of the short circuit induction member corresponding to the coating portion of the electrode assembly.

The contact maintaining part may include at least one of polyphenylene sulfide (PPS) or Teflon.

In one embodiment, the short circuit induction member further includes: a coupling part coupled to the at least one of the first or second non-coating portions; and a penetration part extending from the coupling part along the longitudinal direction of the electrode assembly, and the contact maintaining part is arranged on at least one surface of the penetration part. The coupling part may have a shape conforming with a shape of the at least one of the first or second non-coating portions.

The contact maintaining part may be formed through an injection molding process using the penetration part, or the contact maintaining part may include a tape adhered to the penetration part, or the contact maintaining part may be formed on the penetration part through laminating.

The first non-coating portion may be electrically connected to the case, and the short circuit induction member may be electrically connected to the second non-coating portion.

The first non-coating portion may be electrically connected to the cap plate and the case through a collector.

The short circuit induction member may be electrically insulated from the cap plate and the case.

In one embodiment, the first non-coating portion and the second non-coating portion are electrically insulated from the case and the cap plate, the short circuit induction member includes a first short circuit induction member and a second short circuit induction member, and the first short circuit induction member and the second short circuit induction member are electrically connected to the first non-coating portion and the second non-coating portion, respectively.

The first and second short circuit induction members may be symmetrical to each other with respect to the electrode assembly.

The first and second short circuit induction members may be arranged at opposite surfaces of the electrode assembly, respectively, and the opposite surfaces of the electrode assembly may be arranged along a direction perpendicular to the longitudinal direction of the electrode assembly.

According to an aspect of embodiments of the present invention, a secondary battery has improved safety and, as such, may be used as a motor-driving power source for propelling electric scooters, hybrid vehicles, or electric vehicles.

BRIEF DESCRIPTION OF THE DRAWINGS

The accompanying drawings are included to provide a further understanding of the present disclosure, and are incorporated in and constitute a part of this specification. The drawings illustrate some exemplary embodiments of the present invention and, together with the description, serve to explain principles and aspects of the present invention.

FIG. 7 is an exploded perspective view of a secondary battery according to another embodiment of the present invention.

DETAILED DESCRIPTION

Some exemplary embodiments of the present invention are described more fully hereinafter with reference to the accompanying drawings; however, embodiments of the present invention may be embodied in different forms and should not be construed as limited to the embodiments set forth herein. As those skilled in the art would realize, the described embodiments may be modified in various different ways, all without departing from the spirit or scope of the present invention. Accordingly, the drawings and description are to be regarded as illustrative in nature and not restrictive.

Figure 1:
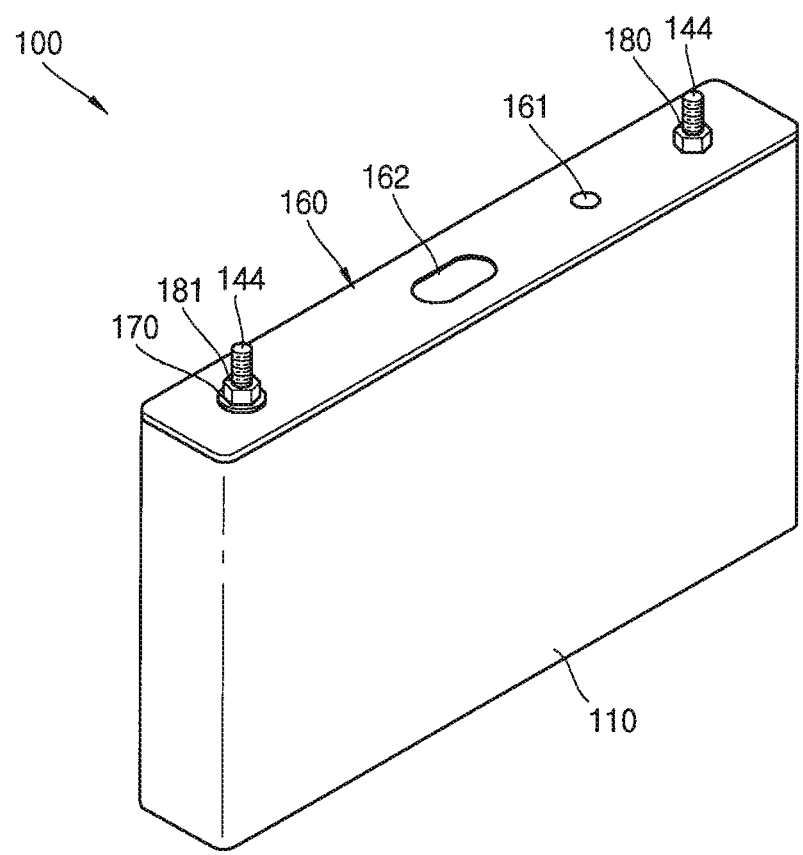
FIG. 1 is a perspective view of a secondary battery according to an embodiment of the present invention.
Figure 2:
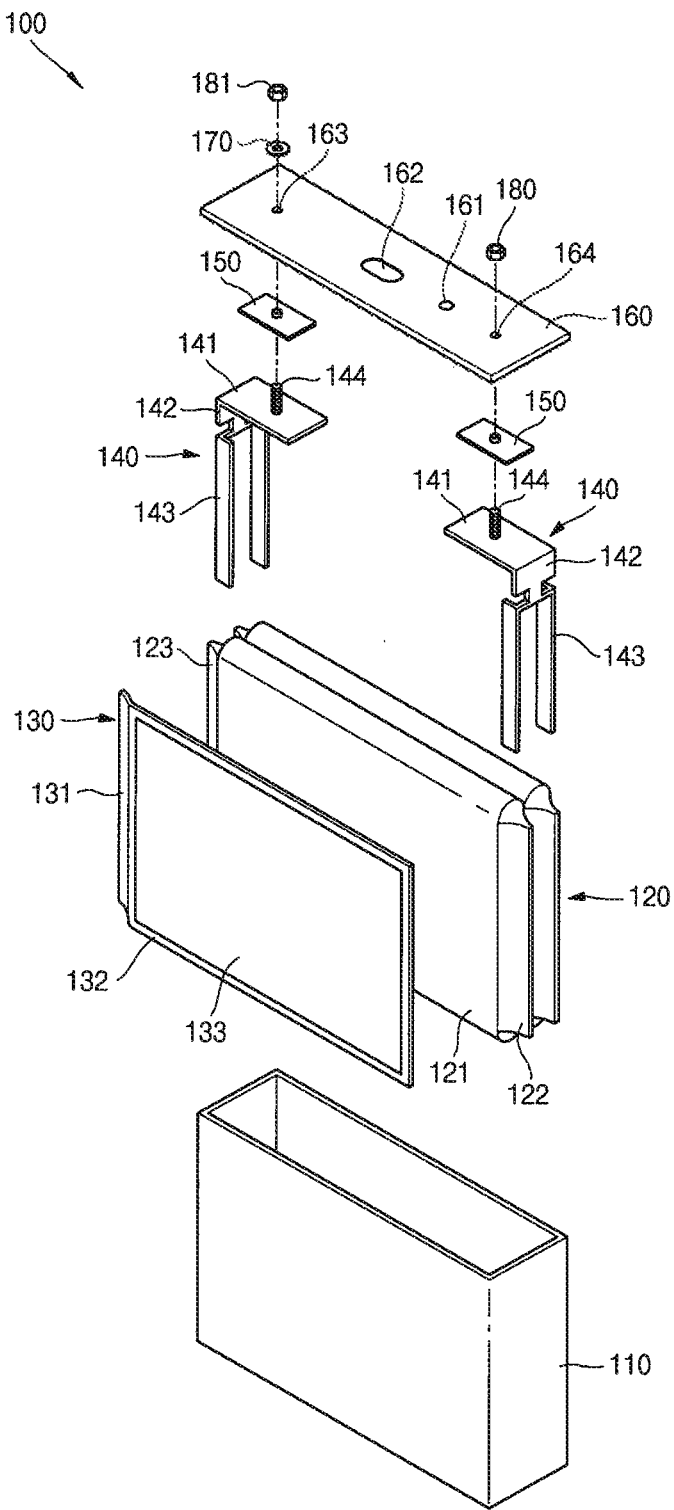
FIG. 2 is an exploded perspective view of the secondary battery of FIG. 1.
Figure 3:
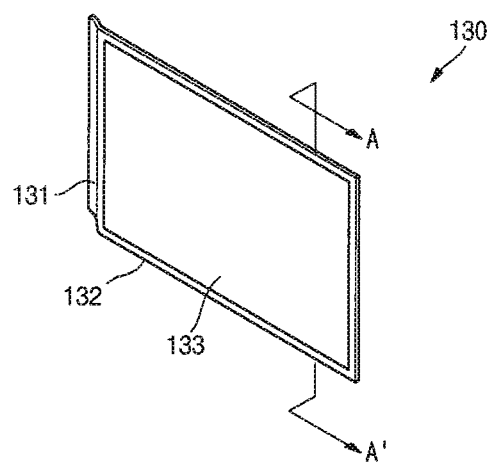
FIG. 3 is a perspective view of a short circuit induction member of the secondary battery of FIG. 1.
Figure 4:
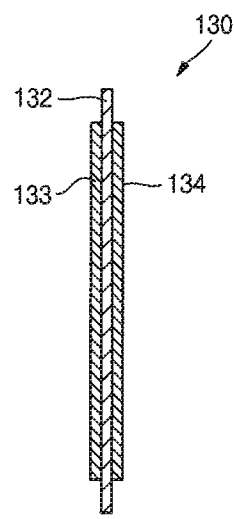
FIG. 4 is a cross-sectional view of the short circuit induction member of FIG. 3, taken along the line A-A'.
Figure 5:
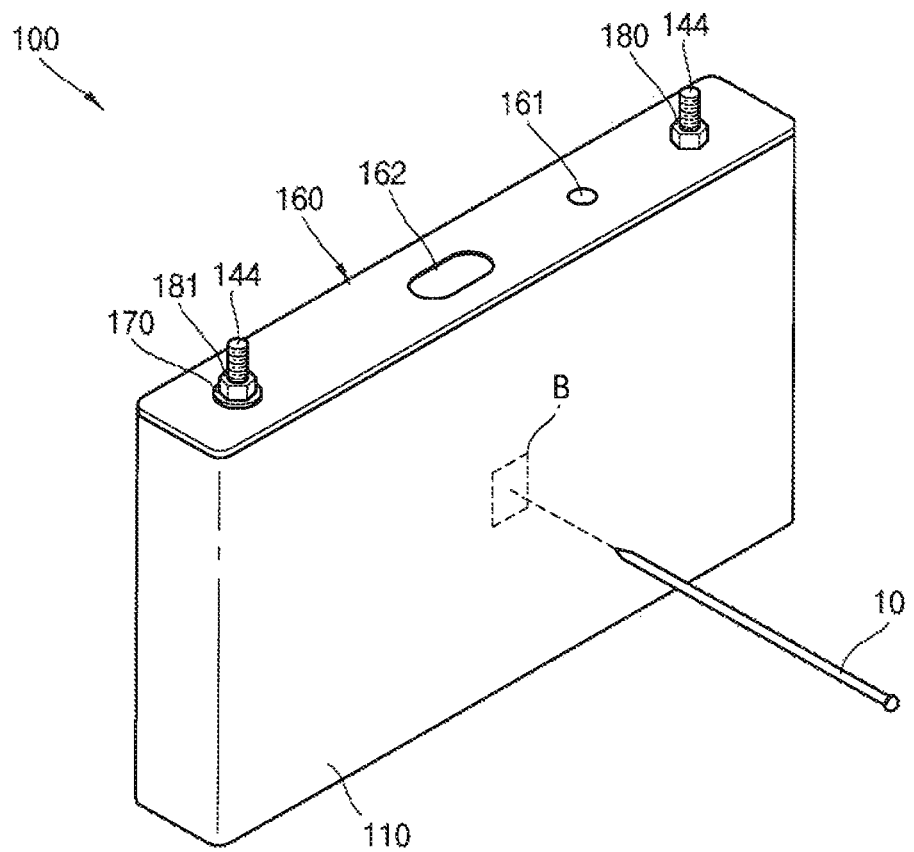
FIG. 5 is a perspective view illustrating a conductor penetrating the secondary battery of FIG. 1.
Figure 6:
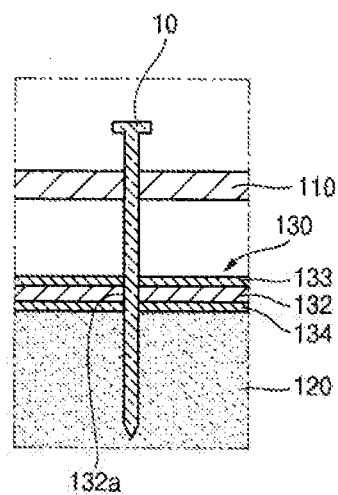
FIG. 6 is a cross-sectional view of a region "B" of FIG. 5, showing a state in which the conductor has penetrated the secondary battery.

FIG. 1 is a perspective view of a secondary battery according to an embodiment of the present invention. FIG. 2 is an exploded perspective view of the secondary battery of FIG. 1. FIG. 3 is a perspective view of a short circuit induction member of the secondary battery of FIG. 1. FIG. 4 is a cross-sectional view of the short circuit induction member of FIG. 3, taken along the line A-A'. FIG. 5 is a perspective view illustrating a conductor penetrating the secondary battery of FIG. 1. FIG. 6 is a cross-sectional view of a region "B" of FIG. 5, showing a state in which the conductor has penetrated the secondary battery.

Referring to FIGS. 1 to 6, a secondary battery 100 according to an embodiment of the present invention includes a case 110, an electrode assembly 120, a short circuit induction member 130, a plurality of collectors 140, a plurality of first insulating members 150, a cap plate 160, a second insulating member 170, and a plurality of nuts 180 and 181.

The case 110, in one embodiment, is formed of a conductive metal, such as aluminum, an aluminum alloy, or steel plated with nickel, and has a generally hexahedron shape with an opening through which the electrode assembly 120 is inserted and housed in the case 110. The cap plate 160 is coupled to an edge of the case 110 defining the opening thereof to seal the electrode assembly 120 and electrolyte in the case 110.

The electrode assembly 120 is inserted in the case 110. The electrode assembly 110 includes a first electrode plate, a separator, and a second electrode plate, which have a thin plate or film shape. The first electrode plate may function as a positive electrode or a negative electrode, and the second electrode plate may have the opposite polarity to that of the first electrode plate.

The first electrode plate is formed by applying a first electrode active material, such as a transition metal oxide, on a first electrode collector formed of metal foil, such as aluminum foil, and includes a region on which the first electrode active metal is not applied, at a side thereof. However, a material used to form the first electrode plate is not limited by the present invention.

The second electrode plate is formed by applying a second electrode active material, such as graphite or carbon, on a second electrode collector formed of metal foil, such as nickel or copper foil, and includes a region on which the second electrode active metal is not applied, at a side thereof.

The separator is disposed between the first electrode plate and the second electrode plate to prevent or substantially prevent short circuiting and allows the movement of lithium ions. The separator, in one embodiment, may be formed of polyethylene, polypropylene, or combined film of polypropylene and polyethylene.

The electrode assembly 120 and the electrolyte are accommodated in the case 110. The electrolyte may include: an organic solvent, such as ethylene carbonate (EC), propylene carbonate (PC), diethyl carbonate (DEC), ethyl methyl carbonate (EMC), or dimethyl carbonate (DMC); and a lithium salt such as $LiPF_6$ or $LiBF_4$. The electrolyte may be liquid, solid, or gel.

The electrode assembly 120 may be formed by winding or stacking the first electrode plate, the second electrode plate, and the separator. Regions of the first and second electrode plates on which the first and second electrode active materials are applied are disposed approximately at the longitudinal central region of the electrode assembly 120, and constitute a coating portion 121. The regions of the first and second electrode plates, on which the first and second electrode active materials are not applied, constitute first and second non-coating portions 122 and 123 at both ends of the electrode assembly 120. The separator may envelop an outermost region of the electrode assembly 120 corresponding to the coating portion 121. Accordingly, the coating portion 121 is not exposed to the outside of the electrode assembly 120.

The first non-coating portion 122 disposed at an end of the first electrode plate, and the second non-coating portion 123 disposed at another end of the second electrode plate are exposed to the outside of the electrode assembly 120. In one embodiment, the first non-coating portion 122 may be electrically connected to the case 110 and the cap plate 160, and the second non-coating portion 123 may be electrically insulated from the case 110 and the cap plate 160.

The short circuit induction member 130 is coupled to the second non-coating portion 123, and is extended along the coating portion 121. Since the coating portion 121 is enveloped by the separator, the coating portion 121 does not contact the short circuit induction member 130.

In a normal state, the short circuit induction member 130 is electrically connected to the second non-coating portion 123 of the second electrode, and is electrically insulated from the case 110 and the first electrode. However, when a conductor 10, such as a conductor having a nail or needle shape, penetrates the case 110 from the outside thereof, the short circuit induction member 130 is electrically connected to the case 110 through the conductor 10. Accordingly, the first and second electrodes of the electrode assembly 120 are connected to each other to form a short circuit. The short circuit rapidly consumes inner energy of the electrode assembly 120, thereby ensuring the stability and reliability of the secondary battery 100.

The short circuit induction member 130, in one embodiment, includes: a coupling part 131 disposed at an end thereof; a penetration part 132 extending from the coupling part 131; and contact maintaining parts 133 and 134 disposed on one or more surfaces of the penetration part 132.

The short circuit induction member 130 is coupled to the second non-coating portion 123 through the coupling part 131. The coupling part 131 may be formed of a same material as a metal used to form the second non-coating portion 123 in order to increase a coupling force therebetween. For example, where the second non-coating portion 123 is formed of copper constituting a negative electrode, the coupling part 131 may also be formed of copper. The coupling part 131, in one embodiment, is bent at an angle from the penetration part 132 and is conformed with a shape of the second non-coating portion 123 so as to be tightly contacted thereto. In one embodiment, the coupling part 131 may be electromechanically coupled to the second non-coating portion 123, such as through welding. The welding may be ultrasonic welding, but is not limited thereto.

The penetration part 132 is connected to the coupling part 131, and extends along the longitudinal direction of the electrode assembly 120. The penetration part 132 may extend along a region of the electrode assembly 120 corresponding to the coating portion 121. In one embodiment, the penetration part 132 may entirely cover the electrode assembly 120. Thus, when the conductor 10 penetrates the case 110, the conductor 10 may also penetrate the penetration part 132.

In the normal state, the penetration part 132 is insulated from the case 110 connected to the first electrode. However, when the conductor 10 penetrates the penetration part 132 to form a through hole 132a, the penetration part 132 is connected through the conductor 10 to the case 110 connected to the first electrode. Accordingly, the penetration part 132 electrically connects the second non-coating portion 123 to the first non-coating portion 122 electrically connected to the case 110, thereby forming a short circuit within the electrode assembly 120. Since the penetration part 132 has low electrical resistance, when the short circuit is formed, the penetration part 132 generates a small amount of heat. Thus, when the conductor 10 penetrates the electrode assembly 120 to form a short circuit, the penetration part 132 is heated to consume energy from the secondary battery 100. Since the penetration part 132 has low electrical resistance, a small amount of heat is generated, thus improving the stability and reliability of the secondary battery 100.

The contact maintaining parts 133 and 134 are disposed on one or more surfaces of the penetration part 132. The contact maintaining parts 133 and 134 may tightly contact the penetration part 132. In one embodiment, the contact maintaining parts 133 and 134 may be formed of at least one of polyphenylene sulfide (PPS) or Teflon, which have high strength and heat resistance. The contact maintaining parts 133 and 134 may be formed through an injection molding process using the penetration part 132, or may be provided in the form of a tape to be adhered to the penetration part 132. In another embodiment, the contact maintaining parts 133 and 134 may be formed on the penetration part 132 through laminating.

The contact maintaining parts 133 and 134 have an electrical resistance greater than that of the penetration part 132. Thus, when the conductor 10 penetrates the penetration part 132 and electric current flows therethrough, the contact maintaining parts 133 and 134 generate a smaller amount of heat than the penetration part 132 does. The contact maintaining parts 133 and 134 have high heat resistance. Thus, when the contact maintaining parts 133 and 134 are heated by a short circuit, the contact maintaining parts 133 and 134 do not expand the through hole 132a.

In one embodiment, since the contact maintaining parts 133 and 134 contact one or more surfaces of the penetration part 132, the contact maintaining parts 133 and 134 prevent or substantially prevent expansion of the through hole 132a. Thus, although heat is generated from the penetration part 132, the contact maintaining parts 133 and 134 maintain a state in which the penetration part 132 is connected to the conductor 10. Accordingly, energy from the electrode assembly 120 can be quickly consumed, thereby ensuring the stability and reliability of the secondary battery 100 even though the conductor 10 penetrates the secondary battery 100.

The collectors 140 are provided in a pair to couple to the first and second non-coating portions 122 and 123, respectively. In one embodiment, the collector 140 includes: a body part 141 extending along the longitudinal direction of the electrode assembly 120; a bent part 142 bent from the body part 141 and extending in a vertical or approximately vertical direction; one or more coupling parts 143 extending from the bent part 142 and coupled to the first or second non-coating portion 122 or 123; and a terminal part 144 protruding (e.g., in a vertical direction) from the body part 141, and exposed to the outside of the cap plate 160.

The body part 141, in one embodiment, has a generally flat plate shape and extends (e.g., in a horizontal direction) above the electrode assembly 120 along the longitudinal direction thereof. The body parts 141 may have a width to cover an array of the first and second non-coating portions 122 and 123.

The bent parts 142 may be bent perpendicularly from the body parts 141, and are extended along the first and second non-coating portions 122 and 123. The bent parts 142 may have a width to cover the first and second non-coating portions 122 and 123.

The coupling parts 143 extend (e.g., in a vertical direction) from the bent parts 142. The coupling parts 143 contact the first and second non-coating portions 122 and 123, and may be parallel thereto. In one embodiment, side surfaces of the coupling parts 143 contact side surfaces of the first and second non-coating portions 122 and 123, and may be parallel thereto and electromechanically connected thereto.

The terminal parts 144 protrude (e.g., in a vertical direction) from the body parts 141. The terminal parts 144 protrude from the upper portion of the cap plate 160 to form electrode terminals. In one embodiment, screw threads are formed on the outer circumferential surfaces of the terminal parts 144, such that the nuts 180 and 181 may be coupled to the upper portions of the terminal parts 144. The terminal parts 144 may be integrally formed with the body parts 141, or may be separately formed and coupled thereto.

The first insulating members 150 are disposed on the collectors 140, particularly, on upper portions of the body parts 141. The first insulating members 150 are disposed between the cap plate 160 and the collectors 140. The first insulating members 150 seal the peripheries of terminal holes 163 and 164 formed in the cap plate 160, to prevent or substantially prevent the electrolyte from leaking therethrough. The first insulating members 150 electrically insulate the cap plate 160 and the collectors 140 from each other. The first insulating members 150 include terminal holes therein, such that the terminal parts 144 may be exposed to the upper side of the cap plate 160 through the terminal holes of the first insulating members 150.

The cap plate 160 is coupled to the upper portion of the case 110. The cap plate 160 seals the case 110 to prevent or substantially prevent the electrolyte from leaking out of the case 110. The cap plate 160, in one embodiment, may include an injection hole at a region thereof to inject the electrolyte, and an injection plug 161 closing the injection hole after the injection of the electrolyte. The cap plate 160, in one embodiment, includes a safety vent 162, such as approximately at a central portion thereof. When the secondary battery 100 is overcharged, gas may be generated within the case 110 such that an inner pressure of the case 110 is increased to be greater than a reference pressure. In this case, the safety vent 162 is opened earlier than the other portions of the cap plate 160 so as to discharge the gas, thereby reducing the possibility of explosion due to increased pressure within the case 110. The terminal parts 144 protrude to the upper side of the cap plate 160 through the terminal holes 163 and 164 of the cap plate 160.

The second insulating member 170, in one embodiment, is disposed on the top surface of the cap plate 160 and surrounds the terminal part 144 of the collector 140 that is connected to the second non-coating portion 123. The nut 181 coupled to the terminal part 144 above the cap plate 160 is electrically insulated from the cap plate 160 by the second insulating member 170.

The nuts 180 and 181, in one embodiment, are coupled to the terminal parts 144 from the upper side thereof. Screw threads formed in the nuts 180 and 181 engage with the screw threads of the terminal parts 144. The nuts 180 and 181 are coupled to the terminal parts 144, respectively, to fix the terminal parts 144 to the cap plate 160. Accordingly, the electrode assembly 120 coupled to the collectors 140 is also fixed within the case 110.

As described above, the first non-coating portion 122 of the first electrode of the electrode assembly 120 is electrically connected to the case 110, and an end (i.e. the coupling part 131) of the short circuit induction member 130 extending along the longitudinal direction of the electrode assembly 120 is connected to the second non-coating portion 123 of the second electrode. When the conductor 10 penetrates the secondary battery 100, a short circuit is formed between the first and second electrodes through the case 110, the conductor 10, and the penetration part 132. In this case, since the contact maintaining parts 133 and 134 are attached to one or more surfaces of the penetration part 132, the contact maintaining parts 133 and 134 prevent or substantially prevent expansion of the through hole 132a to maintain the short circuit, thereby quickly discharging the secondary battery 100.

A configuration of a secondary battery according to another embodiment of the present invention is described below.

FIG. 7 is an exploded perspective view of a secondary battery according to another embodiment of the present invention. Like reference numerals denote like elements throughout, and components and features of the secondary battery of FIG. 7 that are different from those of the secondary battery 100 described above are principally described below.

Referring to FIG. 7, a secondary battery 200 according to another embodiment of the present invention includes a case 110, an electrode assembly 120, a plurality of short circuit induction members 130 and 230, a plurality of collectors 140, a plurality of first insulating members 150, a cap plate 160, a plurality of second insulating members 170 and 270, and a plurality of nuts 180 and 181.

In the secondary battery 200 according to an embodiment of the present invention, the short circuit induction members 130 and 230 are provided in a pair. The short circuit induction members 130 and 230 include the short circuit induction member 130 (i.e. a first short circuit induction member) and a second short circuit induction member 230.

The first short circuit induction member 130, in one embodiment, has the same configuration as described above with respect to the secondary battery 100. The first short circuit induction member 130 extends along a surface of the electrode assembly 120. The first short circuit induction member 130 includes: a coupling part 131 at an end thereof to connect to a second non-coating portion 123 of a second electrode of the electrode assembly 120; and a penetration part 132 extending from the coupling part 131 along the longitudinal direction of the electrode assembly 120. As described above, the first short circuit induction member 130 includes contact maintaining parts 133 and 134 on one or more surfaces of the penetration part 132 to continually maintain a short circuit formed by a conductor 10 penetrating the penetration part 132.

The second short circuit induction member 230, in one embodiment, is symmetrical to the first short circuit induction member 130. The second short circuit induction member 230 is disposed on the opposite surface of the electrode assembly 120 to that of the first short circuit induction member 130. The conductor 10 may penetrate both the first and second short circuit induction members 130 and 230. In this case, the second short circuit induction member 230 is connected to the first short circuit induction member 130 through the conductor 10 and thereby forms a short circuit between the first electrode and the second electrode of the electrode assembly 120. The short circuit rapidly consumes inner energy of the electrode assembly 120, thereby ensuring stability and reliability of the secondary battery 200.

In one embodiment, the second short circuit induction member 230 includes: a coupling part 231 coupled to a first non-coating portion 122 of the first electrode of the electrode assembly 120; a penetration part 232 extending from the coupling part 231; and contact maintaining parts 234 disposed on one or more surfaces of the penetration part 232. The coupling part 231 and the penetration part 232 may be formed of aluminum to correspond to a collecting plate forming the first electrode of the electrode assembly 120. The contact maintaining parts 234 disposed on one or more surfaces of the penetration part 232 may prevent or substantially prevent expansion of a through hole formed by the conductor 10 penetrating the penetration part 232. As described above with respect to the contact maintaining parts 133 and 134 of the short circuit induction member 130, the contact maintaining parts 234 may be formed of at least one of polyphenylene sulfide (PPS) or Teflon, which have high strength and heat resistance. The contact maintaining parts 234 may be formed through an injection molding process using the penetration part 232, or may be provided in the form of a tape to be adhered to the penetration part 232. In another embodiment, the contact maintaining parts 234 may be formed on the penetration part 232 through laminating.

Thus, when the conductor 10 penetrates the secondary battery 200, the second short circuit induction member 230 forms a short circuit with the first short circuit induction member 130 and maintains the short circuit, thereby stably consuming energy from the electrode assembly 120.

The second insulating members 170 and 270 are disposed between the cap plate 160 and the nuts 181 and 180, respectively. The second insulating members 170 and 270 insulate the nuts 181 and 180 from the cap plate 160, respectively. Thus, in a normal state, the case 110 and the cap plate 160 are electrically insulated from the electrode assembly 120.

As described above, the first and second short circuit induction members 130 and 230 are coupled to the second and first non-coating portions 123 and 122, respectively, and the contact maintaining parts 133 and 134, or 234 are disposed on one or more surfaces of each of the first and second short circuit induction members 130 and 230. Thus, through holes formed by the conductor 10 penetrating the first and second short circuit induction members 130 and 230 are prevented or substantially prevented from expanding so as to stably consume energy from the electrode assembly 120.

According to an embodiment of the present invention, a first non-coating portion of a first electrode of an electrode assembly is connected to a case, and an end of a short circuit induction member extending along the longitudinal direction of the electrode assembly is connected to a second non-coating portion of a second electrode. When a conductor penetrates a secondary battery, a short circuit is formed between the first and second electrodes through the case, the conductor, and a penetration part. In this case, since contact maintaining parts are attached to one or more surfaces of the penetration part, the contact maintaining parts prevent or substantially prevent expansion of a through hole of the penetration part to maintain the short circuit, thereby quickly discharging the secondary battery.

According to another embodiment of the present invention, first and second short circuit induction members are coupled to second and first non-coating portions of an electrode assembly, respectively, and contact maintaining parts are disposed on one or more surfaces of each of the first and second short circuit induction members. Thus, through holes formed by a conductor penetrating the first and second short circuit induction members are prevented or substantially prevented from expanding so as to stably consume energy from the electrode assembly.

While some exemplary embodiments of a secondary battery have been described herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present disclosure as set forth in the following claims and equivalents thereof.

What is claimed is:

1. A secondary battery comprising:
 a case including an accommodation space therein:
 an electrode assembly housed in the case, the electrode assembly comprising a coating portion, a first electrode including a first non-coating portion, and a second electrode including a second non-coating portion;
 a short circuit induction member comprising a plate shaped penetration part electrically connected to at least one of the first or second non-coating portions; and
 a cap plate sealing the case,
 wherein the short circuit induction member further comprises a contact maintaining part having an electrical resistance greater than the penetration part and extending along a longitudinal direction of the electrode assembly, the contact maintaining part comprising a first contact maintaining part attached to and tightly contacting a first surface of the penetration part and a second contact maintaining part attached to and tightly contacting a second surface of the penetration part opposite the first surface of the penetration part.

2. The secondary battery as claimed in claim 1, wherein the contact maintaining part is at a region of the short circuit induction member corresponding to the coating portion of the electrode assembly.

3. The secondary battery as claimed in claim 1, wherein the contact maintaining part comprises at least one of polyphenylene sulfide (PPS) or Teflon.

4. The secondary battery as claimed in claim 1, wherein the short circuit induction member further comprises:
 a coupling part coupled to the at least one of the first or second non-coating portions, and
 wherein the penetration part extends from the coupling part along the longitudinal direction of the electrode assembly.

5. The secondary battery as claimed in claim 4, wherein the coupling part has a shape conforming with a shape of the at least one of the first or second non-coating portions.

6. The secondary battery as claimed in claim 4, wherein the contact maintaining part is formed through an injection molding process using the penetration part, or the contact maintaining part comprises a tape adhered to the penetration part, or the contact maintaining part is formed on the penetration part through laminating.

7. The secondary battery as claimed in claim 1, wherein the first non-coating portion is electrically connected to the case, and the short circuit induction member is electrically connected to the second non-coating portion.

8. The secondary battery as claimed in claim 7, wherein the first non-coating portion is electrically connected to the cap plate and the case through a collector.

9. The secondary battery as claimed in claim 7, wherein the short circuit induction member is electrically insulated from the cap plate and the case.

10. The secondary battery as claimed in claim 1,
 wherein the first non-coating portion and the second non-coating portion are electrically insulated from the case and the cap plate,
 wherein the short circuit induction member comprises a first short circuit induction member and a second short circuit induction member, and
 wherein the first short circuit induction member and the second short circuit induction member are electrically connected to the first non-coating portion and the second non-coating portion, respectively.

11. The secondary battery as claimed in claim 10, wherein the first and second short circuit induction members are symmetrical to each other with respect to the electrode assembly.

12. The secondary battery as claimed in claim 10,
 wherein the first and second short circuit induction members are arranged at opposite surfaces of the electrode assembly, respectively, and
 wherein the opposite surfaces of the electrode assembly are arranged along a direction perpendicular to the longitudinal direction of the electrode assembly.

\* \* \* \* \*